(12) United States Patent
Chen

(10) Patent No.: US 9,090,277 B1
(45) Date of Patent: Jul. 28, 2015

(54) FOLDABLE BABY STROLLER

(71) Applicant: Way-Hong Chen, Taipei (TW)

(72) Inventor: Way-Hong Chen, Taipei (TW)

( * ) Notice: Subject to any disclaimer, the term of this patent is extended or adjusted under 35 U.S.C. 154(b) by 0 days.

(21) Appl. No.: 14/506,724

(22) Filed: Oct. 6, 2014

(51) Int. Cl.
| | |
|---|---|
| *B62B 7/04* | (2006.01) |
| *B62B 7/06* | (2006.01) |
| *B62B 7/08* | (2006.01) |
| *B62B 9/14* | (2006.01) |
| *B62B 9/26* | (2006.01) |

(52) U.S. Cl.
CPC ............... *B62B 7/086* (2013.01); *B62B 9/142* (2013.01); *B62B 9/26* (2013.01)

(58) Field of Classification Search
CPC .............. B62B 7/04; B62B 7/06; B62B 7/08; B62B 7/044; B62B 7/062; B62B 7/066; B62B 7/068; B62B 7/086
USPC .............. 280/642, 647, 649, 650, 658, 47.38, 280/47.4
See application file for complete search history.

(56) References Cited

U.S. PATENT DOCUMENTS

| | | | |
|---|---|---|---|
| 8,894,090 B1* | 11/2014 | Chen | 280/647 |
| 2015/0076777 A1* | 3/2015 | Cheng | 280/42 |

* cited by examiner

*Primary Examiner* — Hau Phan
*Assistant Examiner* — Bryan Evans
(74) *Attorney, Agent, or Firm* — Alan D. Kamrath; Kamrath IP Lawfirm, P.A.

(57) ABSTRACT

A baby stroller includes a frame unit, two support units connected with the frame unit, two linking units connected with the frame unit and the support units, a cross connection unit mounted between the support units and the linking units, a locking mechanism mounted between the support units, a handle unit connected with the support units, and a pull strap connected with the linking units. Thus, the upper frame and the lower frame of the frame unit are pivoted downward to be close to each other so as to collapse the frame unit into two parts after the stroller is folded. In addition, the user has to unlock the locking mechanism and each of the linking units so as to collapse the baby stroller so that the baby stroller is folded by two stages.

9 Claims, 17 Drawing Sheets

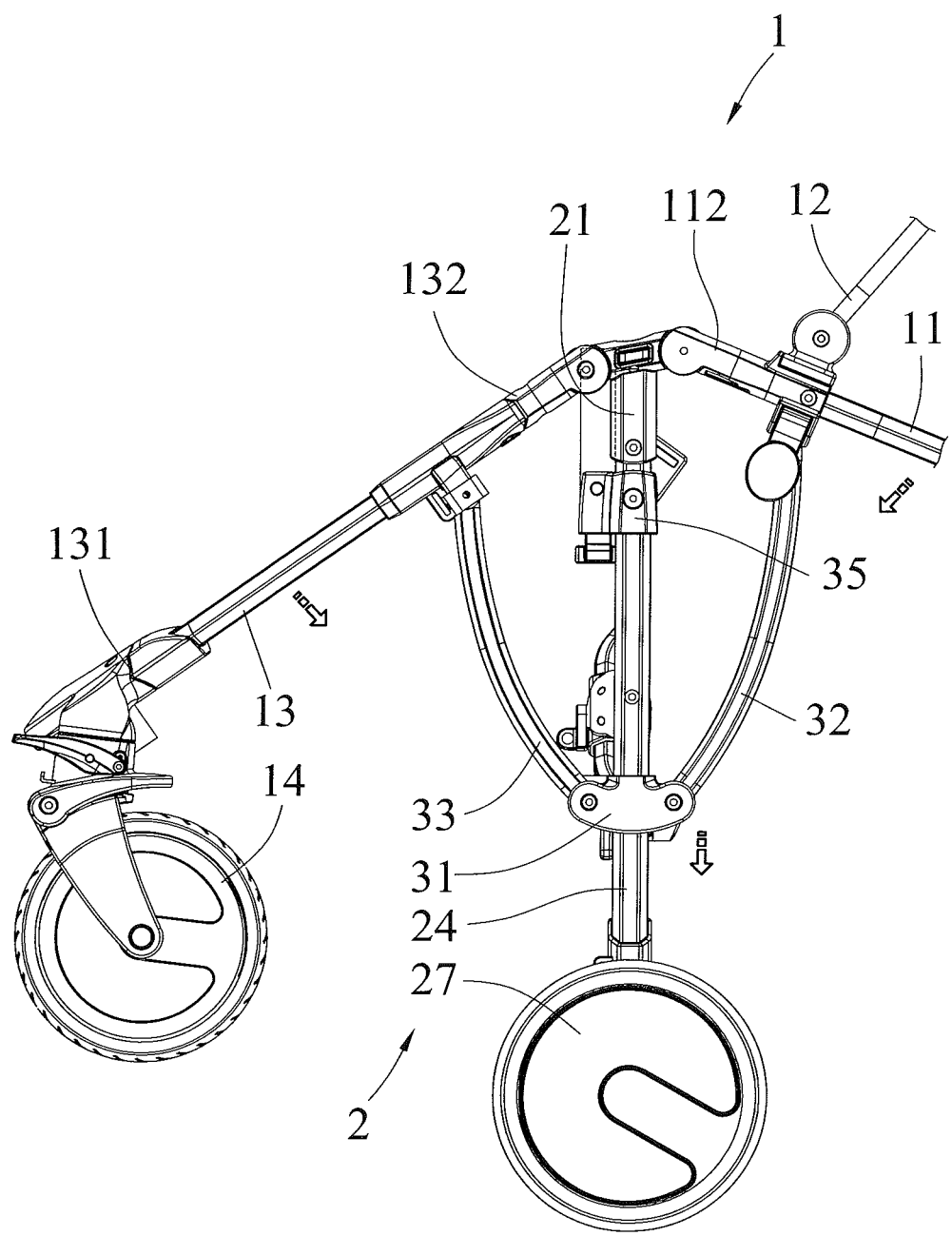
F I G . 17

FOLDABLE BABY STROLLER

BACKGROUND OF THE INVENTION

1. Field of the Invention

The present invention relates to a stroller and, more particularly, to a foldable baby stroller.

2. Description of the Related Art

A conventional baby stroller comprises a main frame, a plurality of castors, a canopy, a handlebar, and a locking mechanism. When the locking mechanism is unlocked, the main frame can be collapsed so as to fold the baby stroller. However, the folded baby stroller has a greater height, thereby causing inconvenience in storage, transportation and packaging of the folded baby stroller. In addition, the user only needs to unlock the locking mechanism so as to fold the baby stroller, so that the baby stroller is easily collapsed when the locking mechanism is unlocked due to accidental hit or unintentional touch, thereby causing danger to the infant seated in the baby stroller.

BRIEF SUMMARY OF THE INVENTION

In accordance with the present invention, there is provided a baby stroller comprising a frame unit, two support units connected with the frame unit, two linking units connected with the frame unit and the support units, a cross connection unit mounted between the support units and the linking units, a locking mechanism mounted between the support units, a handle unit connected with the support units, and a pull strap connected with the linking units. The frame unit includes an upper frame having two opposite ends each provided with an upper connector pivotally connected with each of the support units, a lower frame having two opposite ends each provided with a lower connector pivotally connected with each of the support units, a side frame pivotally connected with the upper frame, and at least one front wheel mounted on the lower frame. Each of the support units includes a rear leg, a connecting piece mounted on a first end of the rear leg and having a top provided with a locking recess and a side provided with a mounting recess connected to the locking recess, a retainer mounted in the mounting recess of the connecting piece and provided with a locking hole, a first elastic member mounted in the mounting recess of the connecting piece and biased between the connecting piece and the retainer, a push member mounted in the rear leg, a second elastic member mounted in the rear leg and biased between the rear leg and the push member, a rear wheel mounted on a second end of the rear leg, and a connecting bracket mounted on the second end of the rear leg. Each of the linking units includes a first connecting block movably mounted on the rear leg of each of the support units and provided with a retaining slot, an upper curved lever having a first end pivotally connected with the first connecting block and a second end pivotally connected with the respective upper connector of the upper frame of the frame unit, a lower curved lever having a first end pivotally connected with the first connecting block and a second end pivotally connected with the respective lower connector of the lower frame of the frame unit, a second connecting block movably mounted on the rear leg of each of the support units, a pivot member pivotally mounted on the second connecting block and having a first end provided with a receiving hole and a second end provided with a protrusion inserted into the retaining slot of the first connecting block, and a third elastic member mounted in the receiving hole of the pivot member and biased between the pivot member and the second connecting block. The pivot member of each of the linking units is provided with a hooked hole located opposite to the protrusion. The cross connection unit includes two oblique levers intersecting each other to form a substantially X-shaped link, and two rotation members each mounted on a mediate portion of each of the oblique levers. The rotation members of the cross connection unit are pivotally connected with each other. Each of the oblique levers of the cross connection unit has a first end pivotally connected with the connecting bracket of each of the support units and a second end pivotally connected with the second connecting block of each of the linking units. The locking mechanism includes two folding bars each having a first end pivotally connected with the connecting bracket of each of the support units, a first rotary base mounted on a second end of one of the folding bars, a second rotary base mounted on a second end of the other one of the folding bars, a positioning block mounted between the first rotary base and the second rotary base, a control member mounted on the first rotary base, a fourth elastic member having a first end mounted on the first rotary base and a second end mounted on the control member, and a fifth elastic member biased between the positioning block and the second rotary base. The first rotary base of the locking mechanism has a first side provided with a first receiving recess, a plurality of first slots and a plurality of first tracks. The second rotary base of the locking mechanism has a first side provided with a second receiving recess and a plurality of second tracks. The positioning block of the locking mechanism is mounted in the first receiving recess of the first rotary base and the second receiving recess of the second rotary base and is provided with a plurality of second slots and a plurality of rails. Each of the second slots of the positioning block has an oblique wall. The rails of the positioning block are received in the first tracks of the first rotary base and the second tracks of the second rotary base. The control member of the locking mechanism is rotatably mounted on a second side of the first rotary base and is provided with a plurality of flanges extended into the first slots of the first rotary base and the second slots of the positioning block. Each of the flanges of the control member is provided with an oblique side abutting the oblique wall of each of the second slots of the positioning block. The handle unit includes a handlebar, and two plugs mounted on two opposite ends of the handlebar. Each of the plugs of the handle unit is inserted into the locking recess of the connecting piece and the locking hole of the retainer of each of the support units. Each of the plugs of the handle unit has a periphery provided with an annular locking groove locked by the retainer of each of the support units. The pull strap has two opposite ends each secured on the hooked hole of the pivot member of each of the linking units.

According to the primary advantage of the present invention, the upper frame and the lower frame of the frame unit are pivoted downward to be close to each other so as to collapse the frame unit into two parts after the stroller is folded, thereby largely reducing the height of the folded baby stroller, and thereby facilitating storage, transportation and packaging of the folded baby stroller.

According to another advantage of the present invention, the user has to drive the control member for unlocking the locking mechanism and has to pull the pull strap for unlocking the first connecting block and the second connecting block of each of the linking units so as to collapse the baby stroller so that the baby stroller is folded by two stages, thereby preventing the baby stroller from being collapsed due to accidental hit or unintentional touch, and thereby enhancing the operational safety of the baby stroller.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 17 is a schematic operational view of the baby stroller as shown in FIG. 11.

DETAILED DESCRIPTION OF THE INVENTION

Figure 1:
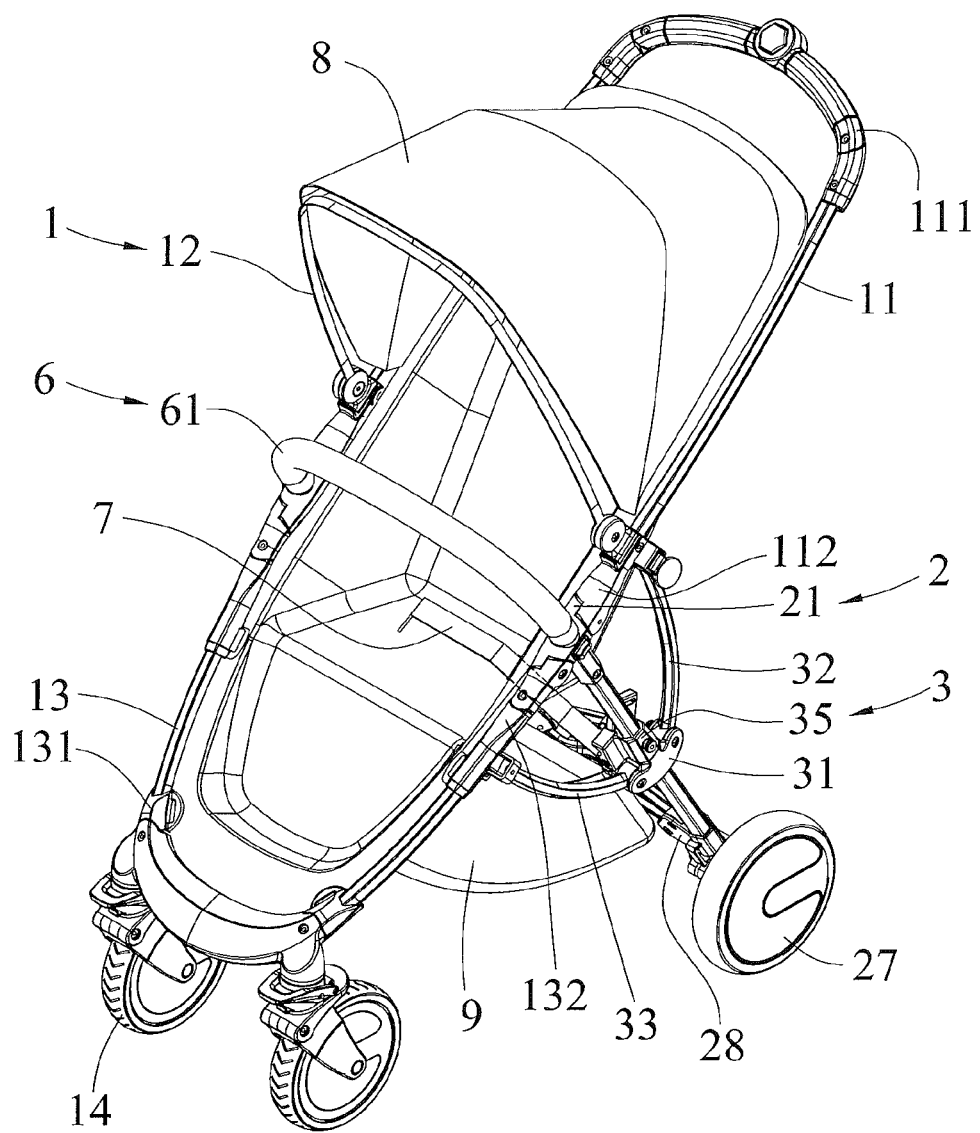
FIG. 1 is a perspective view of a baby stroller in accordance with the preferred embodiment of the present invention.
Figure 2:
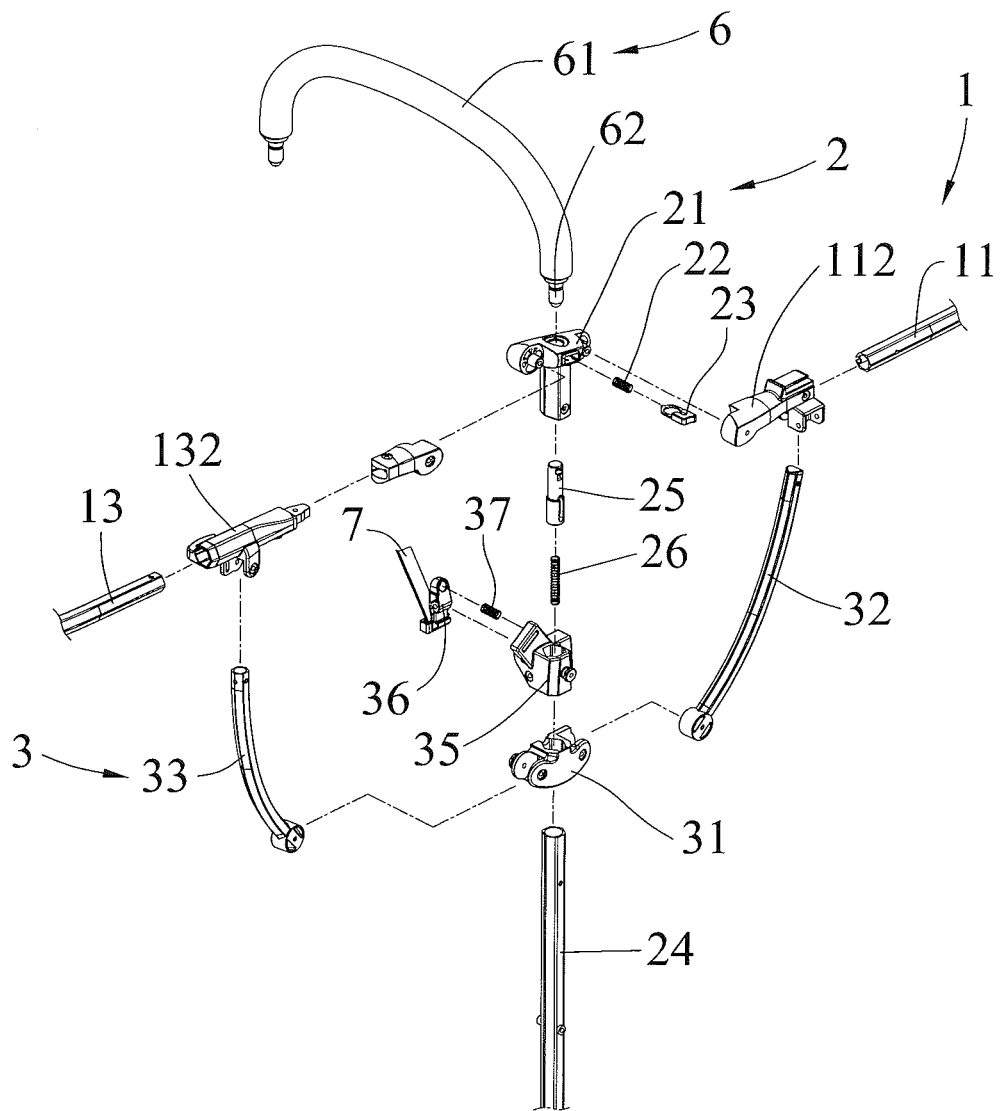
FIG. 2 is a partially exploded perspective view of the baby stroller as shown in FIG. 1.
Figure 3:
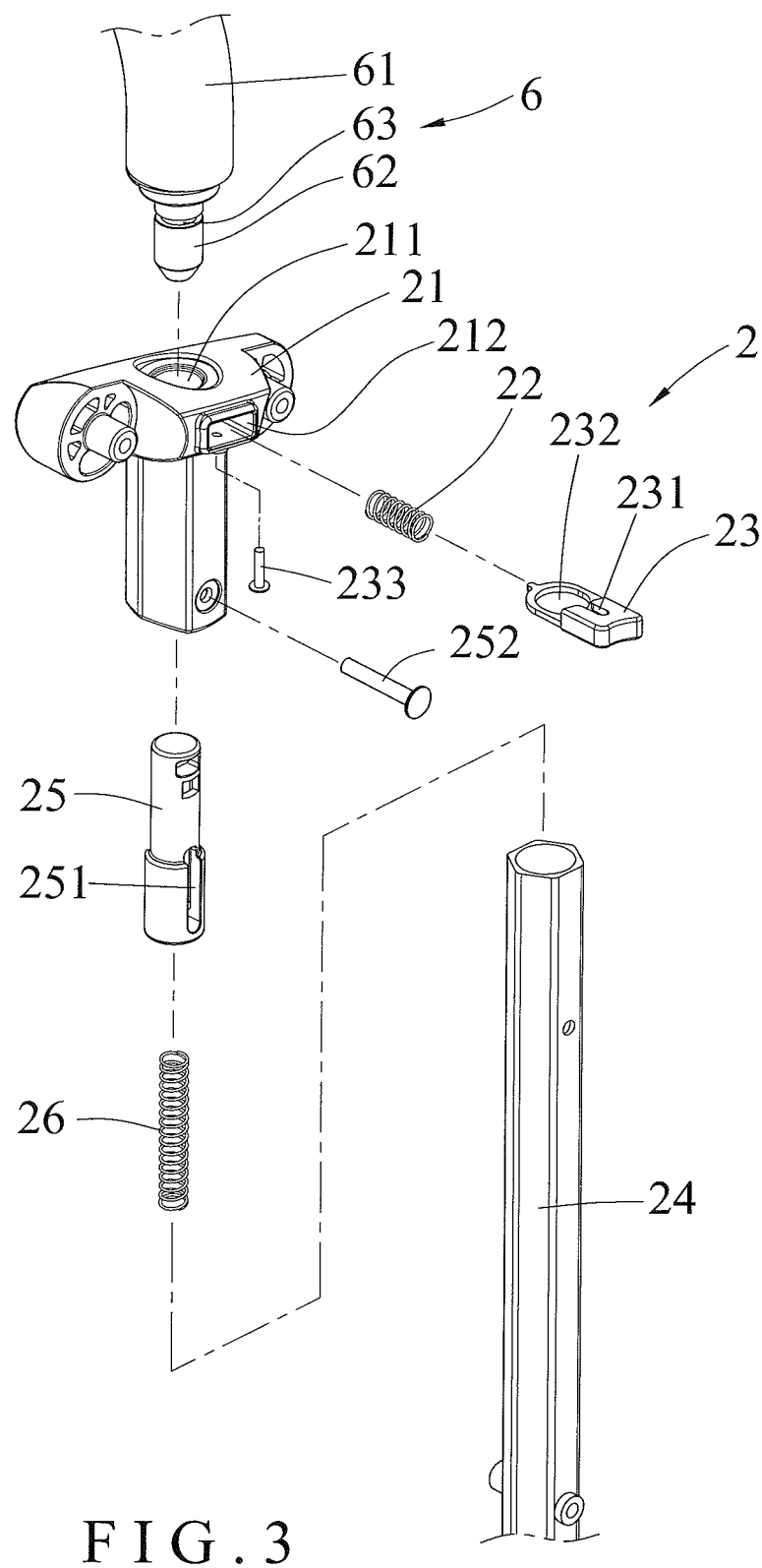
FIG. 3 is a locally enlarged view of the baby stroller as shown in FIG. 2.

Referring to the drawings and initially to FIGS. 1-12, a baby stroller in accordance with the preferred embodiment of the present invention comprises a frame unit 1, two support units 2 connected with the frame unit 1, two linking units 3 connected with the frame unit 1 and the support units 2, a cross connection unit 4 mounted between the support units 2 and the linking units 3, a locking mechanism 5 mounted between the support units 2, a handle unit 6 connected with the support units 2, a pull strap 7 connected with the linking units 3, a canopy 8 connected with the frame unit 1, and a basket 9 connected with the linking units 3.

The frame unit 1 includes an upper frame 11 having two opposite ends each provided with an upper connector 112 pivotally connected with each of the support units 2, a lower frame 13 having two opposite ends each provided with a lower connector 132 pivotally connected with each of the support units 2, a side frame 12 pivotally connected with the upper frame 11, and at least one front wheel 14 mounted on the lower frame 13. Each of the upper frame 11, the lower frame 13 and the side frame 12 of the frame unit 1 has a substantially U-shaped profile. The upper frame 11 of the frame unit 1 is provided with two bendable joints 111 which can be bent freely. The lower frame 13 of the frame unit 1 is provided with two bendable joints 131 which can be bent freely. The upper frame 11 and the lower frame 13 of the frame unit 1 construct the outer frame of the baby stroller. The side frame 12 of the frame unit 1 has two opposite ends each pivotally connected with the upper connector 112 of the upper frame 11 so that the side frame 12 is pivoted freely relative to the upper frame 11 to form a determined angle between the side frame 12 and the upper frame 11. The front wheel 14 of the frame unit 1 is located between the bendable joints 131 of the lower frame 13.

The support units 2 are located symmetrically at two opposite sides of the frame unit 1. Each of the support units 2 is a substantially T-shaped structure and includes a rear leg 24, a connecting piece 21 mounted on a first end of the rear leg 24 and having a top provided with a locking recess 211 and a side provided with a mounting recess 212 connected to the locking recess 211, a retainer 23 mounted in the mounting recess 212 of the connecting piece 21 and provided with a locking hole 232, a limit pin 233 extended through the retainer 23 and secured on the connecting piece 21, a first elastic member 22 mounted in the mounting recess 212 of the connecting piece 21 and biased between the connecting piece 21 and the retainer 23, a push member 25 mounted in the rear leg 24, a guide pin 252 extended through the connecting piece 21, the rear leg 24 and the push member 25, a second elastic member 26 mounted in the rear leg 24 and biased between the rear leg 24 and the push member 25, a rear wheel 27 mounted on a second end of the rear leg 24, and a connecting bracket 28 mounted on the second end of the rear leg 24.

Figure 4:
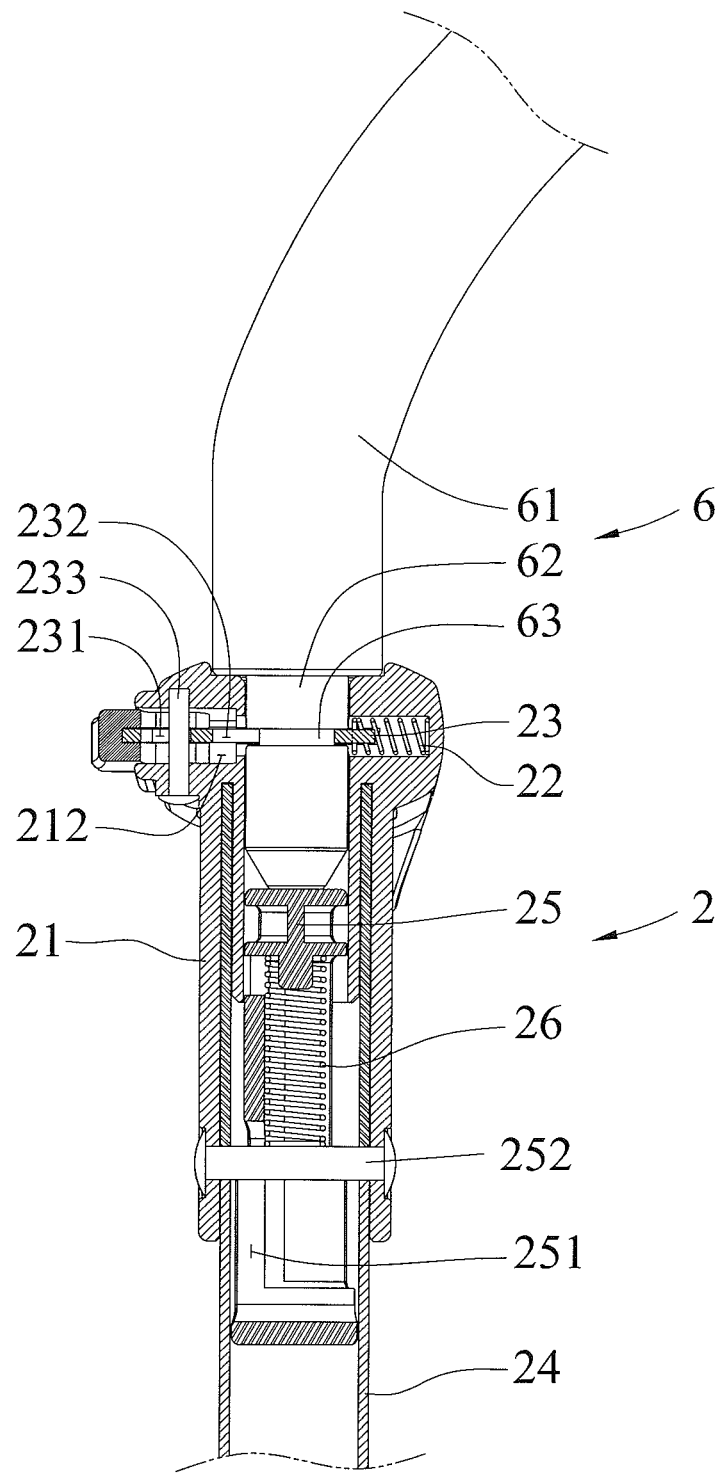
FIG. 4 is a cross-sectional assembly view of the baby stroller as shown in FIG. 3.
Figure 5:
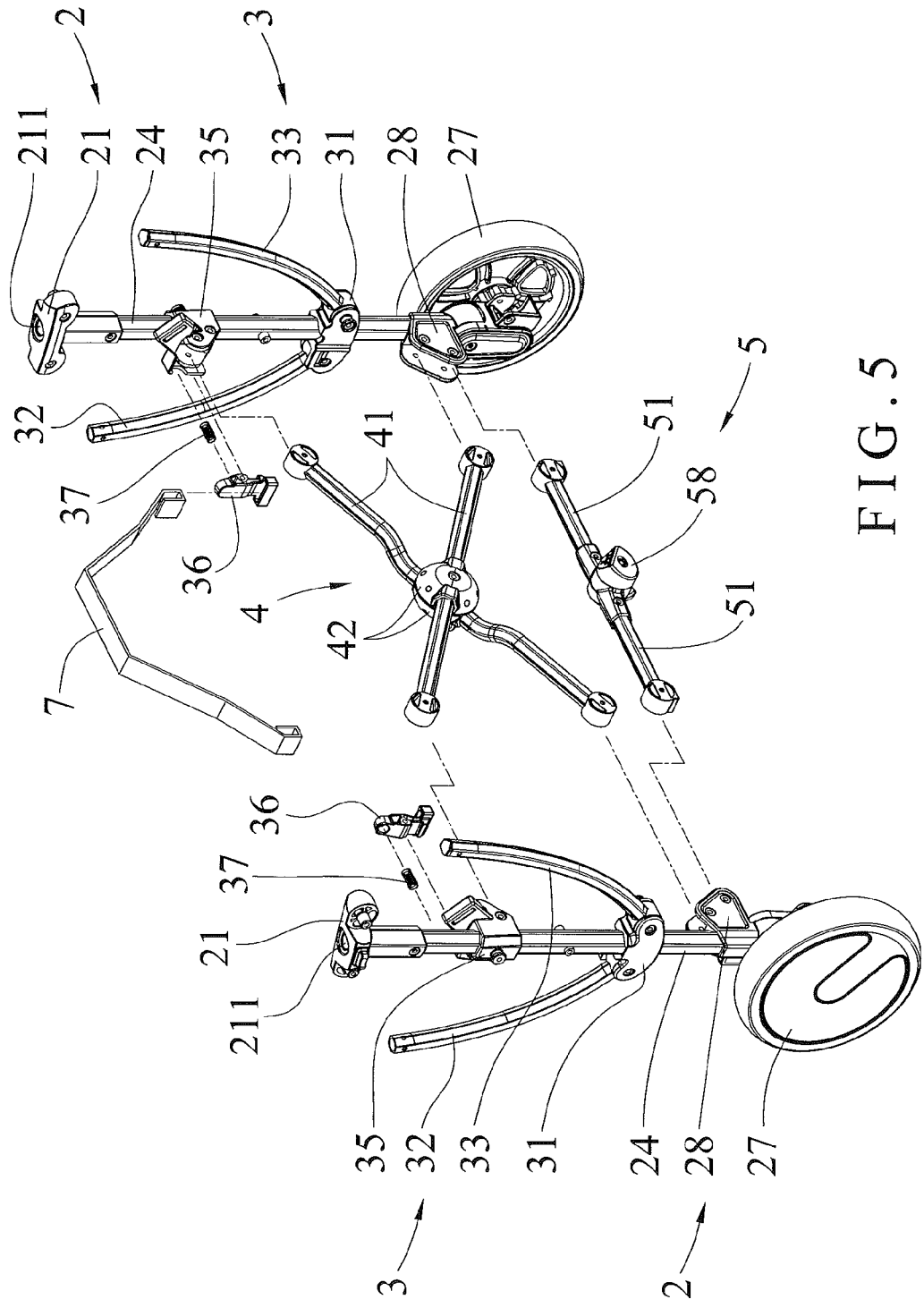
FIG. 5 is a partially exploded perspective view of the baby stroller as shown in FIG. 1.
Figure 6:
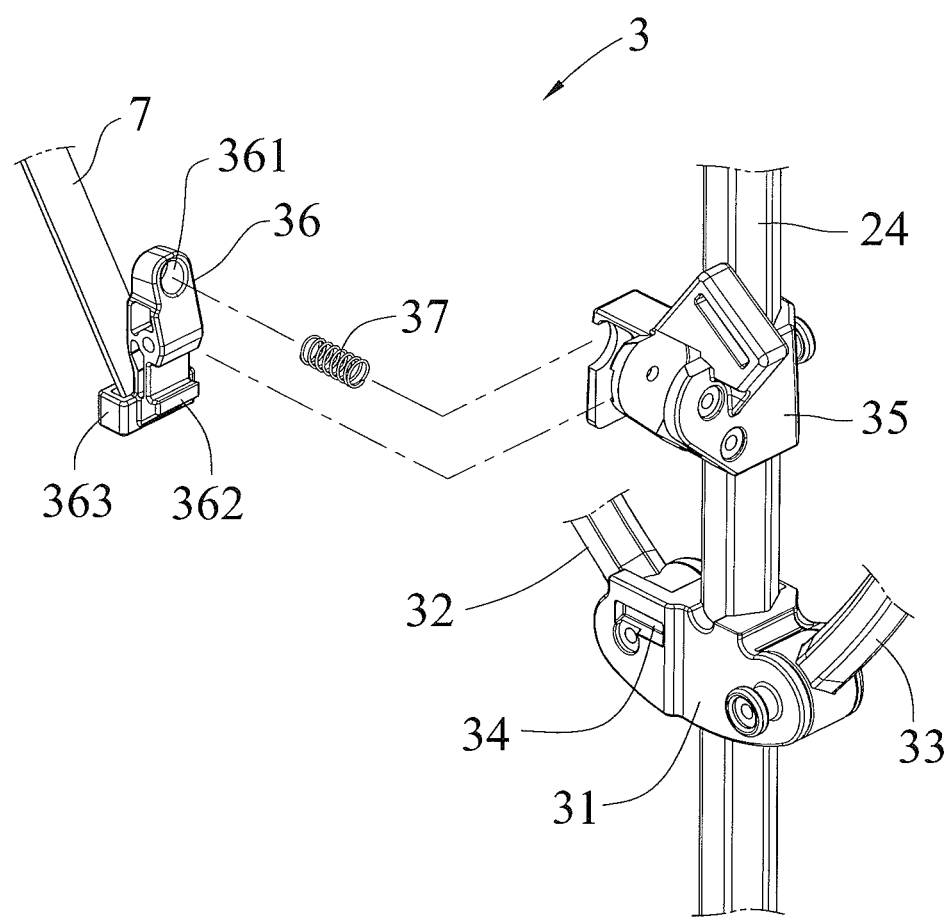
FIG. 6 is a locally enlarged view of the baby stroller as shown in FIG. 2.

The connecting piece 21 of each of the support units 2 has a substantially T-shaped profile. The first elastic member 22 of each of the support units 2 is a compression spring. The retainer 23 of each of the support units 2 is provided with an elongate slit 231 slidably mounted on the limit pin 233 so that the retainer 23 of each of the support units 2 is slidable in the mounting recess 212 of the connecting piece 21. The retainer 23 of each of the support units 2 is pushed by the first elastic member 22 so that the retainer 23 of each of the support units 2 partially protrudes outward from the mounting recess 212 of the connecting piece 21 at a normal state as shown in FIG. 4. The push member 25 of each of the support units 2 is provided with an elongate slot 251 slidably mounted on the guide pin 252 so that the push member 25 of each of the support units 2 is slidable in the rear leg 24. The push member 25 of each of the support units 2 is pushed upward by the second elastic member 26. The second elastic member 26 of each of the support units 2 is a compression spring and has a first end abutting the guide pin 252 and a second end abutting the push member 25.

The linking units 3 are located symmetrically at the two opposite sides of the frame unit 1 and are located under the support units 2. Each of the linking units 3 includes a first connecting block 31 movably mounted on the rear leg 24 of each of the support units 2 and provided with a retaining slot 34, an upper curved lever 32 having a first end pivotally connected with the first connecting block 31 and a second end pivotally connected with the respective upper connector 112 of the upper frame 11 of the frame unit 1, a lower curved lever 33 having a first end pivotally connected with the first connecting block 31 and a second end pivotally connected with the respective lower connector 132 of the lower frame 13 of the frame unit 1, a second connecting block 35 movably mounted on the rear leg 24 of each of the support units 2, a pivot member 36 pivotally mounted on the second connecting block 35 by a pin and having a first end provided with a receiving hole 361 and a second end provided with a protrusion 362 inserted into the retaining slot 34 of the first connecting block 31, and a third elastic member 37 mounted in the receiving hole 361 of the pivot member 36 and biased between the pivot member 36 and the second connecting block 35.

Figure 7:
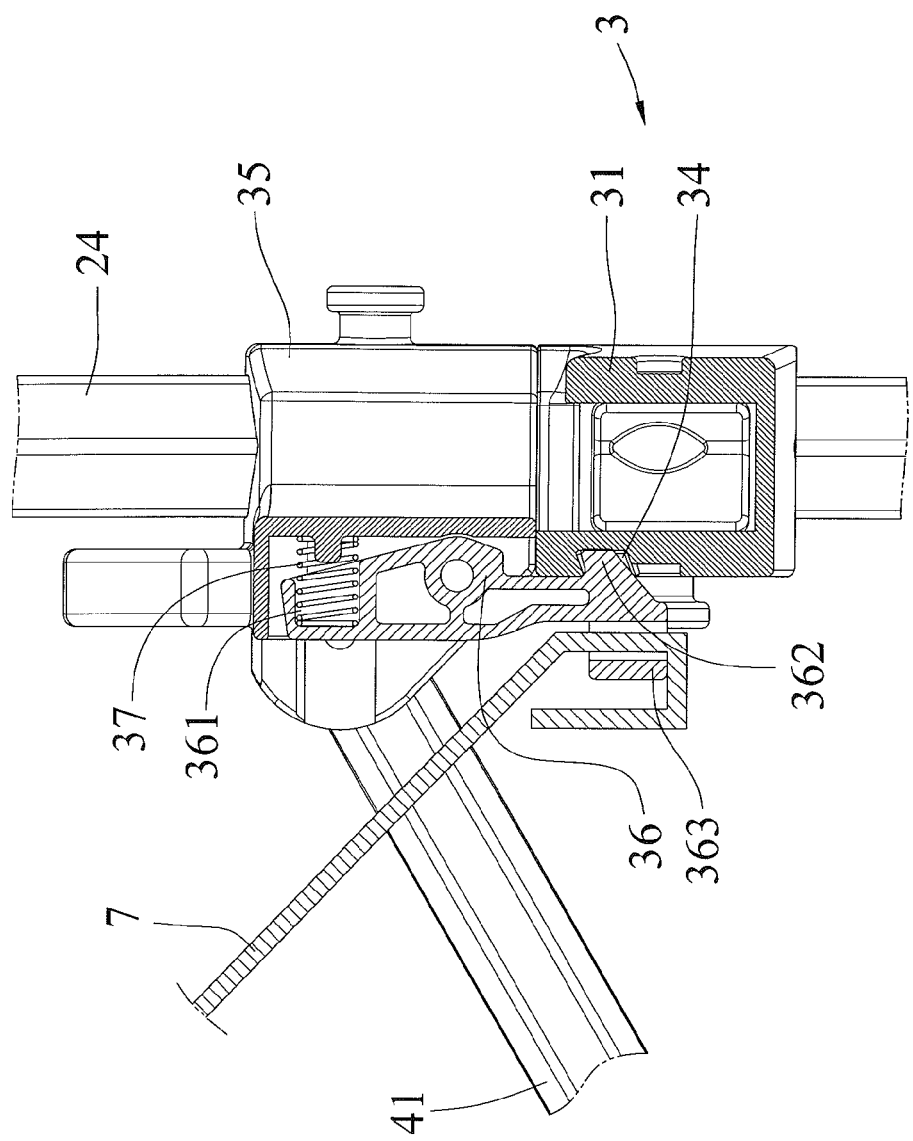
FIG. 7 is a cross-sectional assembly view of the baby stroller as shown in FIG. 6.
Figure 8:
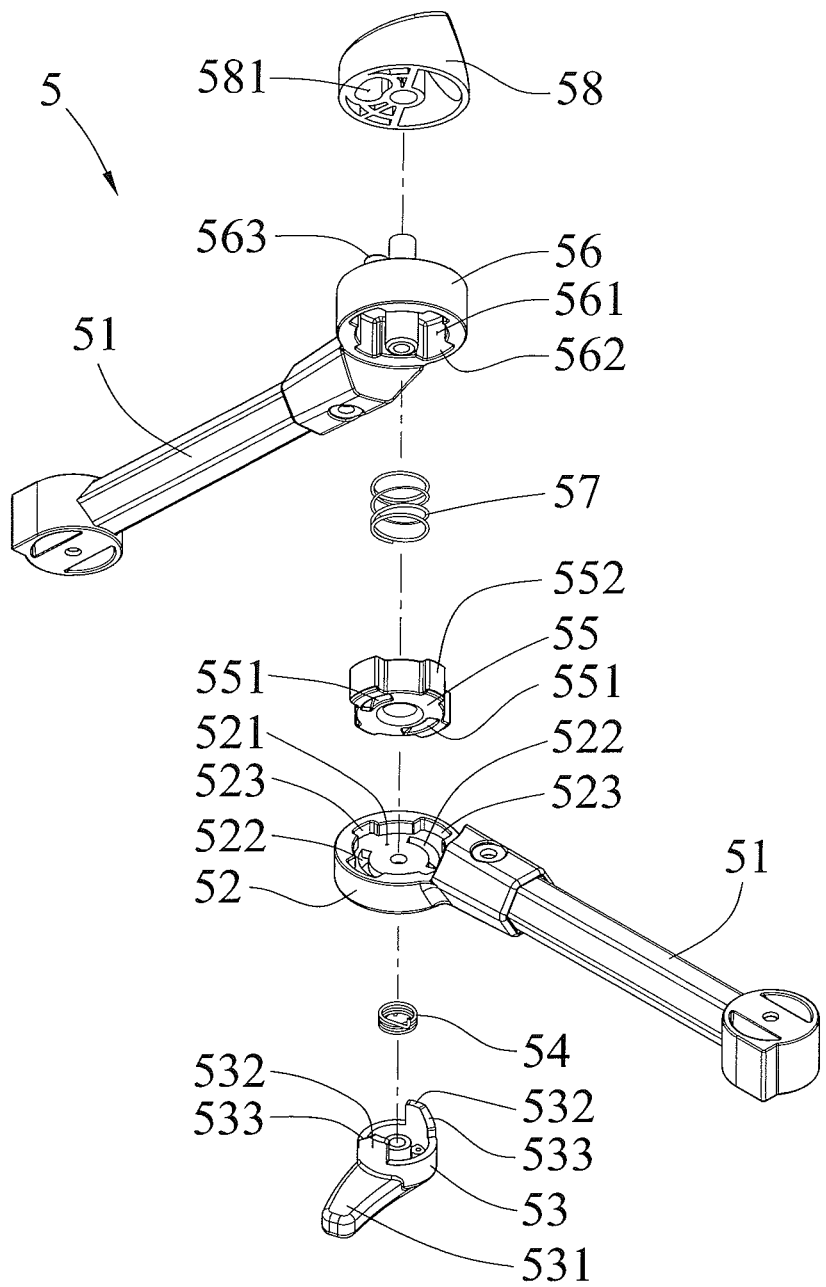
FIG. 8 is an exploded perspective view of a locking mechanism of the baby stroller as shown in FIG. 5.

The first connecting block 31 of each of the linking units 3 has a substantially U-shaped profile and is disposed under the second connecting block 35. The first connecting block 31, the upper curved lever 32 and the lower curved lever 33 of each of the linking units 3 construct a substantially U-shaped structure. The second connecting block 35 of each of the linking units 3 is disposed under the connecting piece 21 of the respective support unit 2. The upper curved lever 32 of each of the linking units 3 has a substantially arcuate shape. The lower curved lever 33 of each of the linking units 3 has a substantially arcuate shape. The pivot member 36 of each of the linking units 3 is provided with a hooked hole 363 located opposite to the protrusion 362. The receiving hole 361 of the pivot member 36 of each of the linking units 3 is disposed above the pin, and the protrusion 362 of the pivot member 36 of each of the linking units 3 is disposed under the pin. The first end of the pivot member 36 of each of the linking units 3 is pushed outward by the third elastic member 37 to pivot the pivot member 36 so that the protrusion 362 of the pivot member 36 is moved toward and locked in the retaining slot 34 of the first connecting block 31 as shown in FIG. 7. Thus, the first connecting block 31 and the second connecting block 35 of each of the linking units 3 are locked together at a normal state.

The cross connection unit 4 includes two oblique levers 41 intersecting each other to form a substantially X-shaped link, and two rotation members 42 each mounted on a mediate portion of each of the oblique levers 41. The rotation members 42 of the cross connection unit 4 are pivotally connected with each other so that the oblique levers 41 are pivotable about the rotation members 42. Each of the oblique levers 41 of the cross connection unit 4 has a first end pivotally connected with the connecting bracket 28 of each of the support units 2 and a second end pivotally connected with the second connecting block 35 of each of the linking units 3 so that the oblique levers 41 of the cross connection unit 4 are pivotally connected between the support units 2 and the linking units 3.

The locking mechanism 5 includes two folding bars 51 each having a first end pivotally connected with the connecting bracket 28 of each of the support units 2, a first rotary base 52 mounted on a second end of one of the folding bars 51, a second rotary base 56 mounted on a second end of the other one of the folding bars 51, a positioning block 55 mounted between the first rotary base 52 and the second rotary base 56, a control member 53 mounted on the first rotary base 52, a fourth elastic member 54 having a first end mounted on the first rotary base 52 and a second end mounted on the control member 53 so that the control member 53 can be restored after rotation, a fifth elastic member 57 biased between the positioning block 55 and the second rotary base 56, a foot pedal 58 mounted on the second rotary base 56, and a connecting pin 59 extending through the control member 53, the fourth elastic member 54, the first rotary base 52, the positioning block 55, the fifth elastic member 57 and the second rotary base 56.

Figure 9:
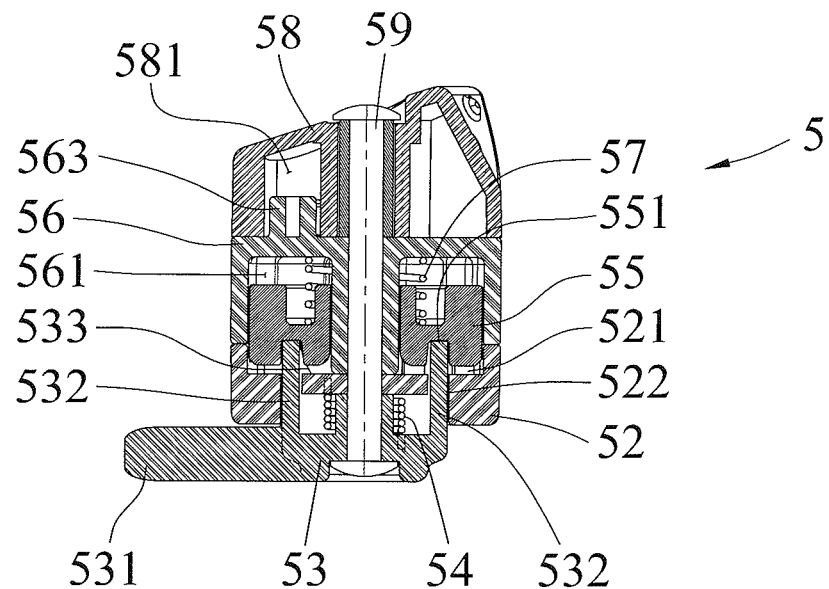
FIG. 9 is a cross-sectional assembly view of the locking mechanism of the baby stroller as shown in FIG. 8.

The first rotary base 52 of the locking mechanism 5 has a first side provided with a first receiving recess 521, a plurality of (preferably two) first slots 522 and a plurality of (preferably four) first tracks 523. The first receiving recess 521 of the first rotary base 52 has a depth smaller than the height of the positioning block 55. Each of the first slots 522 of the first rotary base 52 has a substantially arcuate shape. The second rotary base 56 of the locking mechanism 5 has a first side provided with a second receiving recess 561 and a plurality of (preferably four) second tracks 562. The second receiving recess 561 of the second rotary base 56 has a depth greater than or equal to the height of the positioning block 55. The positioning block 55 of the locking mechanism 5 is mounted in the first receiving recess 521 of the first rotary base 52 and the second receiving recess 561 of the second rotary base 56 and is provided with a plurality of (preferably two) second slots 551 and a plurality of (preferably four) rails 552. Each of the second slots 551 of the positioning block 55 has a substantially arcuate shape and has an oblique wall. The rails 552 of the positioning block 55 are received in the first tracks 523 of the first rotary base 52 and the second tracks 562 of the second rotary base 56. The control member 53 of the locking mechanism 5 is rotatably mounted on a second side of the first rotary base 52 and is provided with a plurality of (preferably two) flanges 532 extended into the first slots 522 of the first rotary base 52 and the second slots 551 of the positioning block 55. Each of the flanges 532 of the control member 53 is provided with an oblique side 533 abutting the oblique wall of each of the second slots 551 of the positioning block 55. The control member 53 of the locking mechanism 5 has a periphery provided with an elongate a drive plate 531 to facilitate a user driving the control member 53. The fourth elastic member 54 of the locking mechanism 5 is a torsion spring and is received in the control member 53. The fifth elastic member 57 of the locking mechanism 5 is a compression spring and is received in the second receiving recess 561 of the second rotary base 56. The fifth elastic member 57 of the locking mechanism 5 pushes the positioning block 55 toward the first rotary base 52 so that the positioning block 55 is disposed between the first receiving recess 521 of the first rotary base 52 and the second receiving recess 561 of the second rotary base 56 as shown in FIG. 9, and the rails 552 of the positioning block 55 are inserted between the first tracks 523 of the first rotary base 52 and the second tracks 562 of the second rotary base 56 so that the folding bars 51 are locked and cannot be pivoted. The foot pedal 58 of the locking mechanism 5 is mounted on a second side of the second rotary base 56 and is provided with a limit slot 581. The second side of the second rotary base 56 is provided with a limit post 563 mounted in the limit slot 581 of the foot pedal 58.

The handle unit 6 includes a handlebar 61, and two plugs 62 mounted on two opposite ends of the handlebar 61. The handlebar 61 of the handle unit 6 has a substantially inverted U-shaped profile. Each of the plugs 62 of the handle unit 6 is inserted into the locking recess 211 of the connecting piece 21 and the locking hole 232 of the retainer 23 of each of the support units 2 and abuts the push member 25 of each of the support units 2. Each of the plugs 62 of the handle unit 6 has a periphery provided with an annular locking groove 63 locked by the retainer 23 of each of the support units 2. Thus, the first elastic member 22 of each of the support units 2 pushes the retainer 23 so that the retainer 23 of each of the support units 2 is locked in the locking groove 63 of each of the plugs 62. Preferably, each of the plugs 62 of the handle unit 6 has a tapered distal end to facilitate insertion of each of the plugs 62 into the locking recess 211 of the connecting piece 21 and the locking hole 232 of the retainer 23 of each of the support units 2.

The pull strap 7 has two opposite ends each secured on the hooked hole 363 of the pivot member 36 of each of the linking units 3. The canopy 8 is mounted on the upper frame 11, the side frame 12 and the lower frame 13 of the frame unit 1. The basket 9 is mounted between the lower curved levers 33 of the linking units 3.

Figure 14:
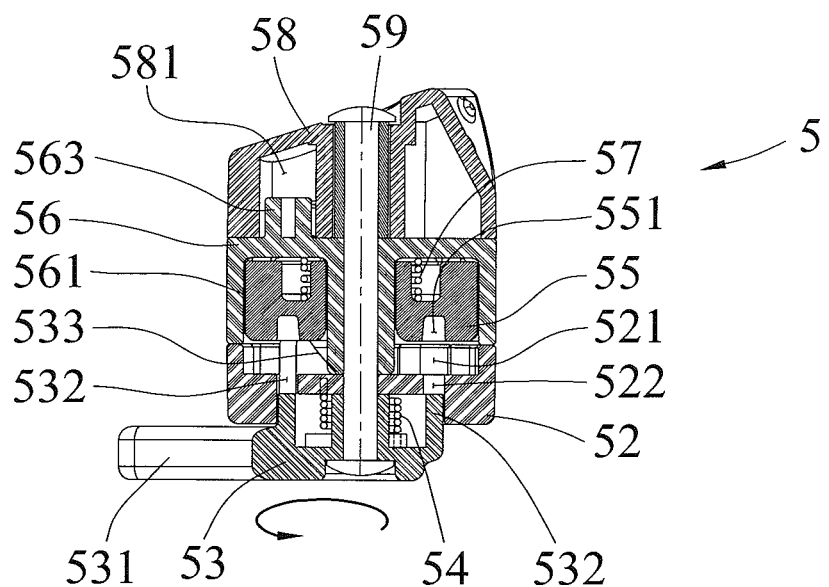
FIG. 14 is a schematic operational view of the baby stroller as shown in FIG. 9.
Figure 10:
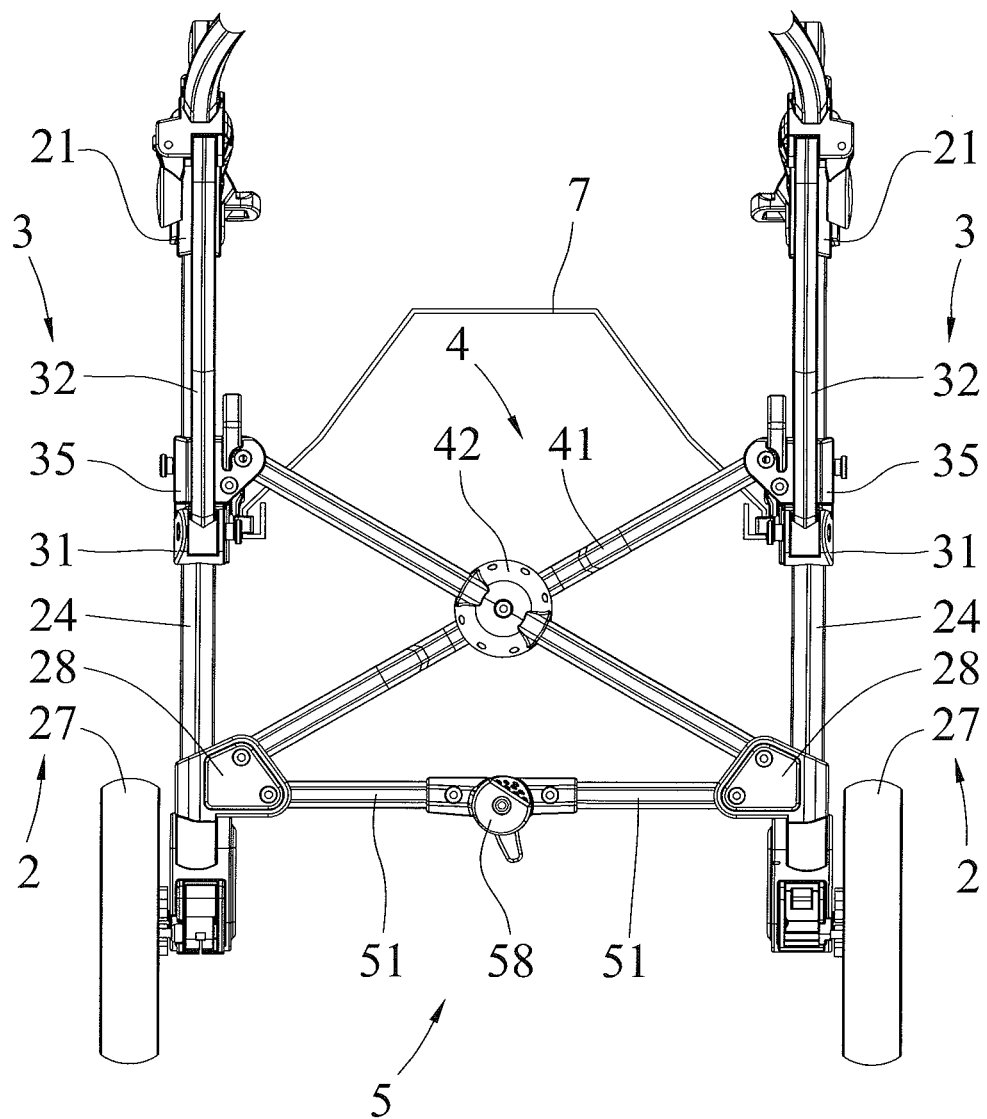
FIG. 10 is a partially rear view of the baby stroller as shown in FIG. 1.
Figure 11:
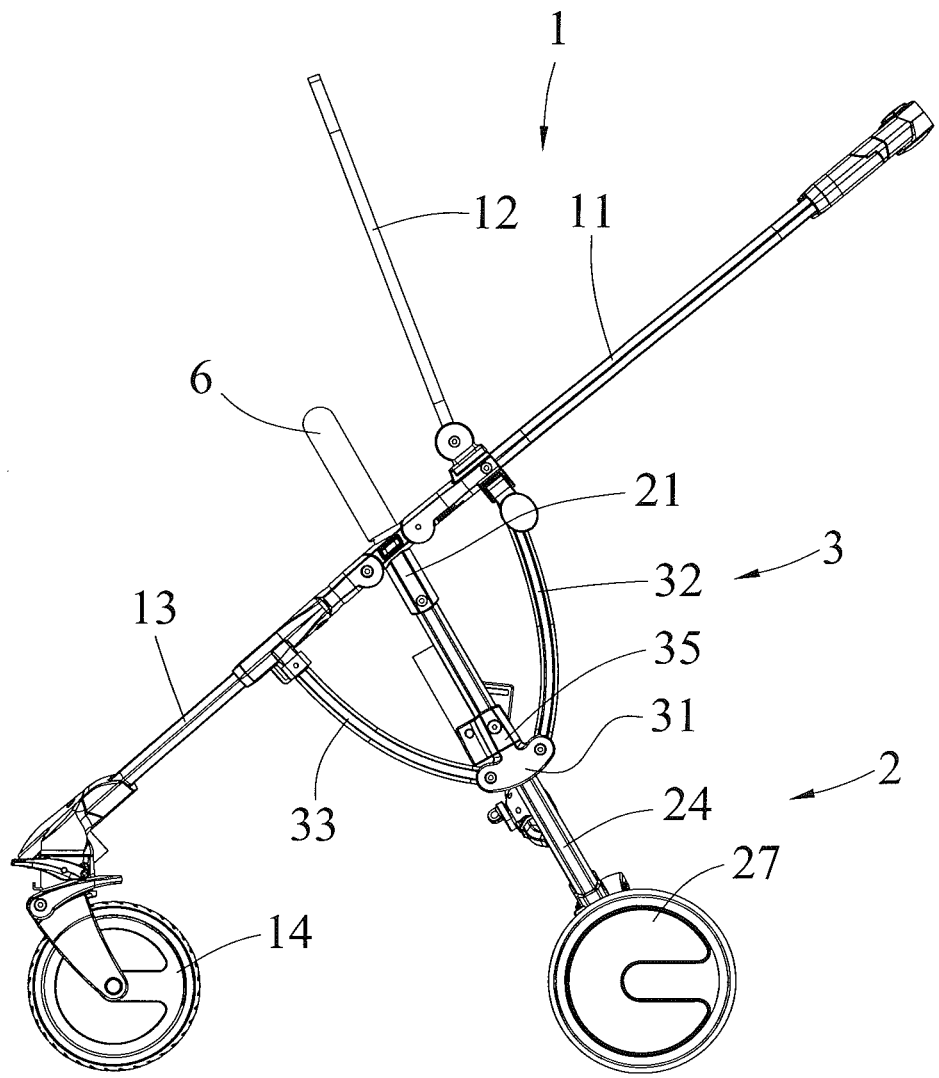
FIG. 11 is a partially side view of the baby stroller as shown in FIG. 1.
Figure 12:
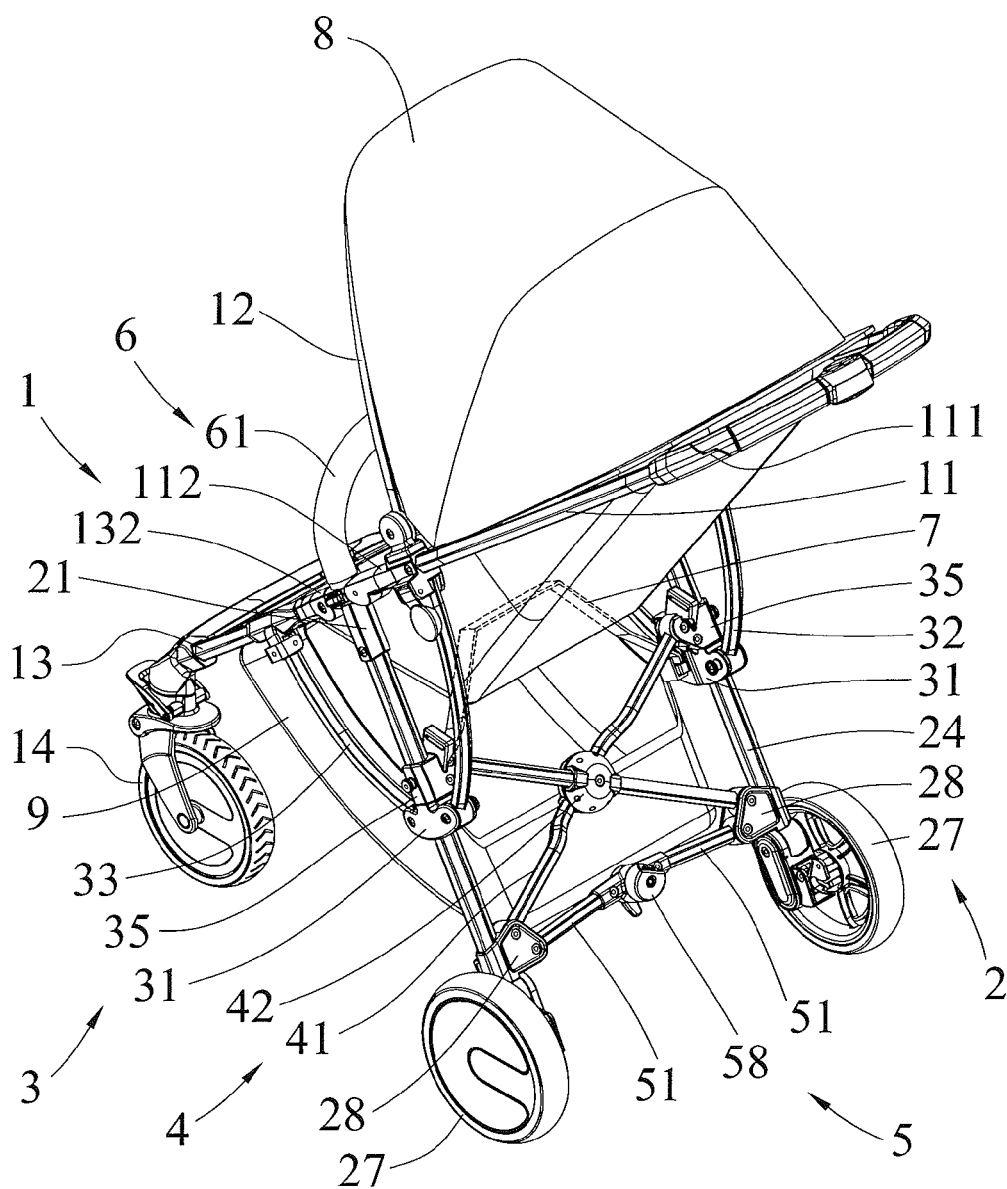
FIG. 12 is a rear perspective view of the baby stroller as shown in FIG. 1.
Figure 13:
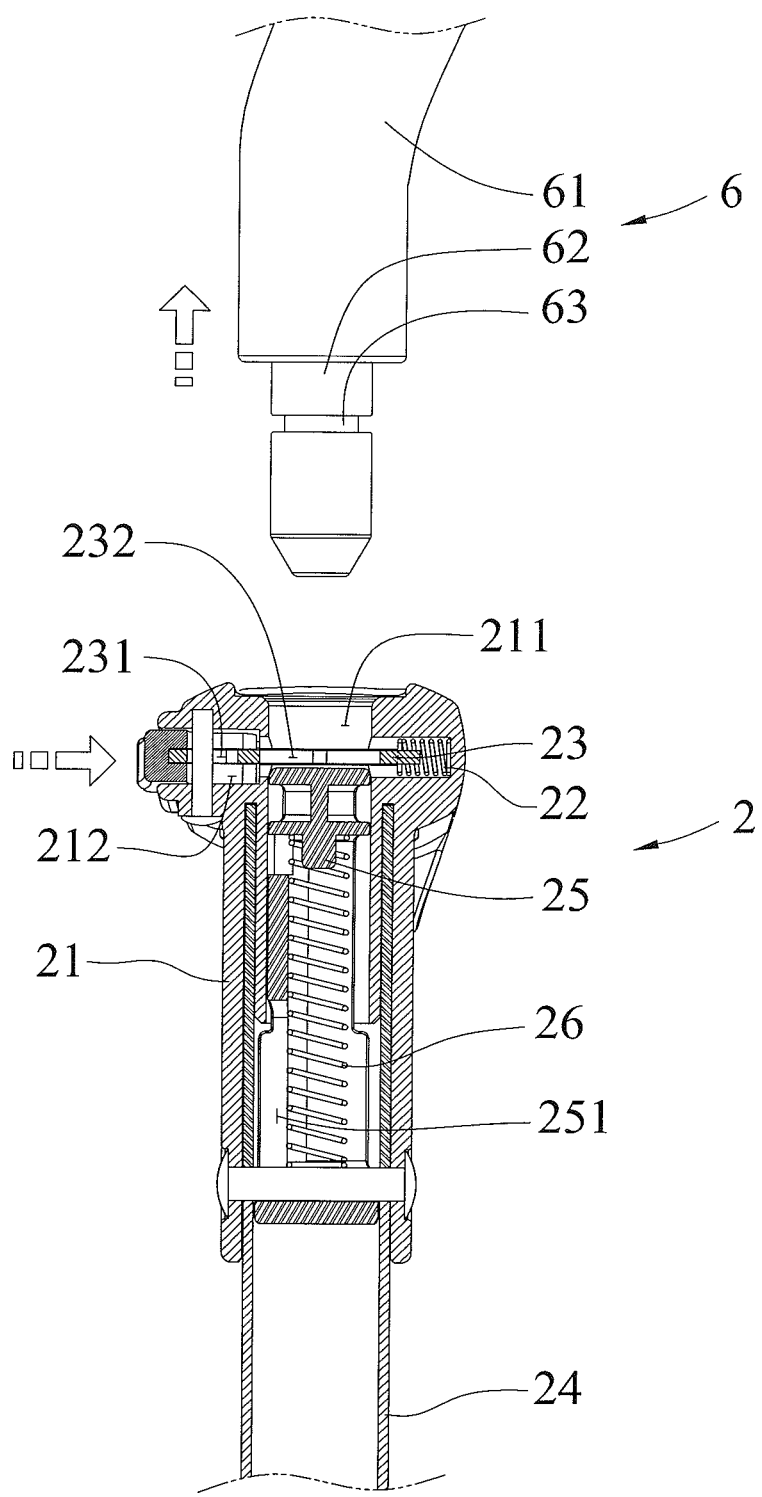
FIG. 13 is a schematic operational view of the baby stroller as shown in FIG. 4.
Figure 15:
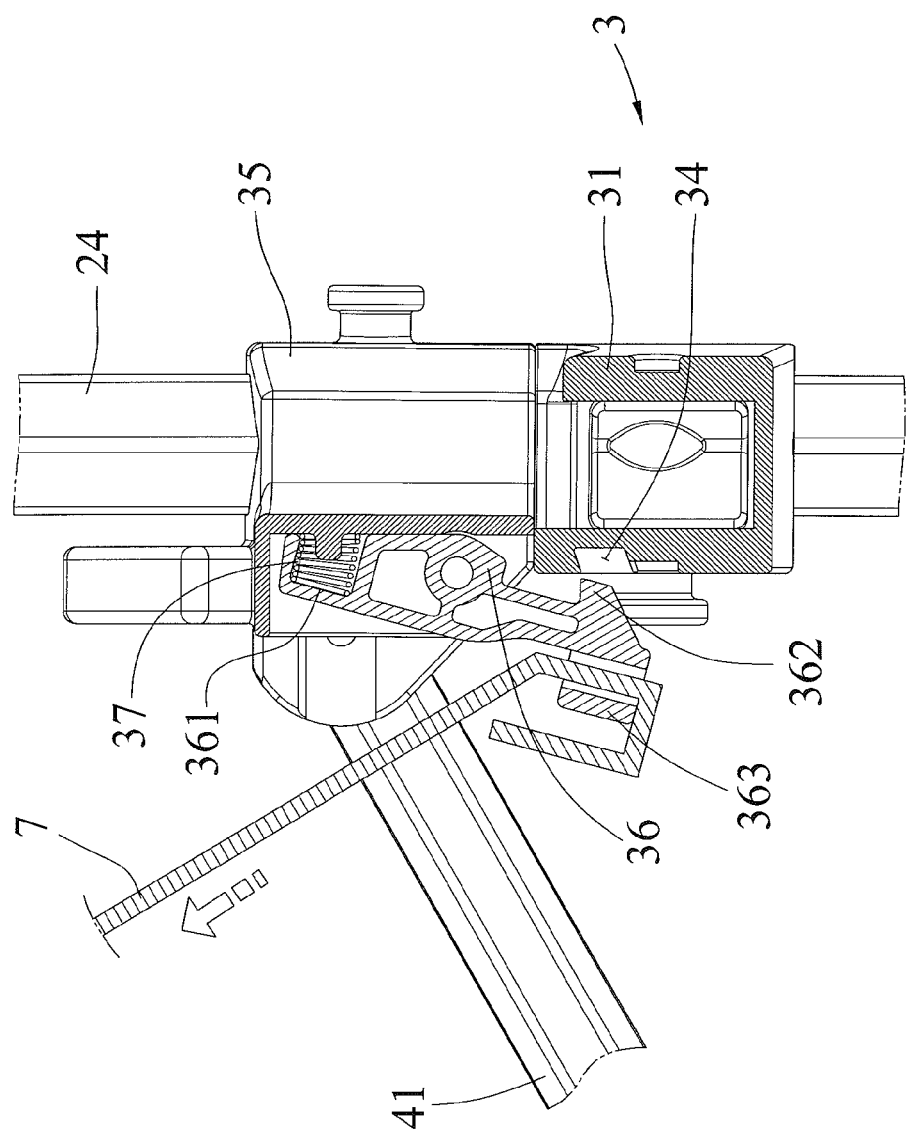
FIG. 15 is a schematic operational view of the baby stroller as shown in FIG. 7.
Figure 16:
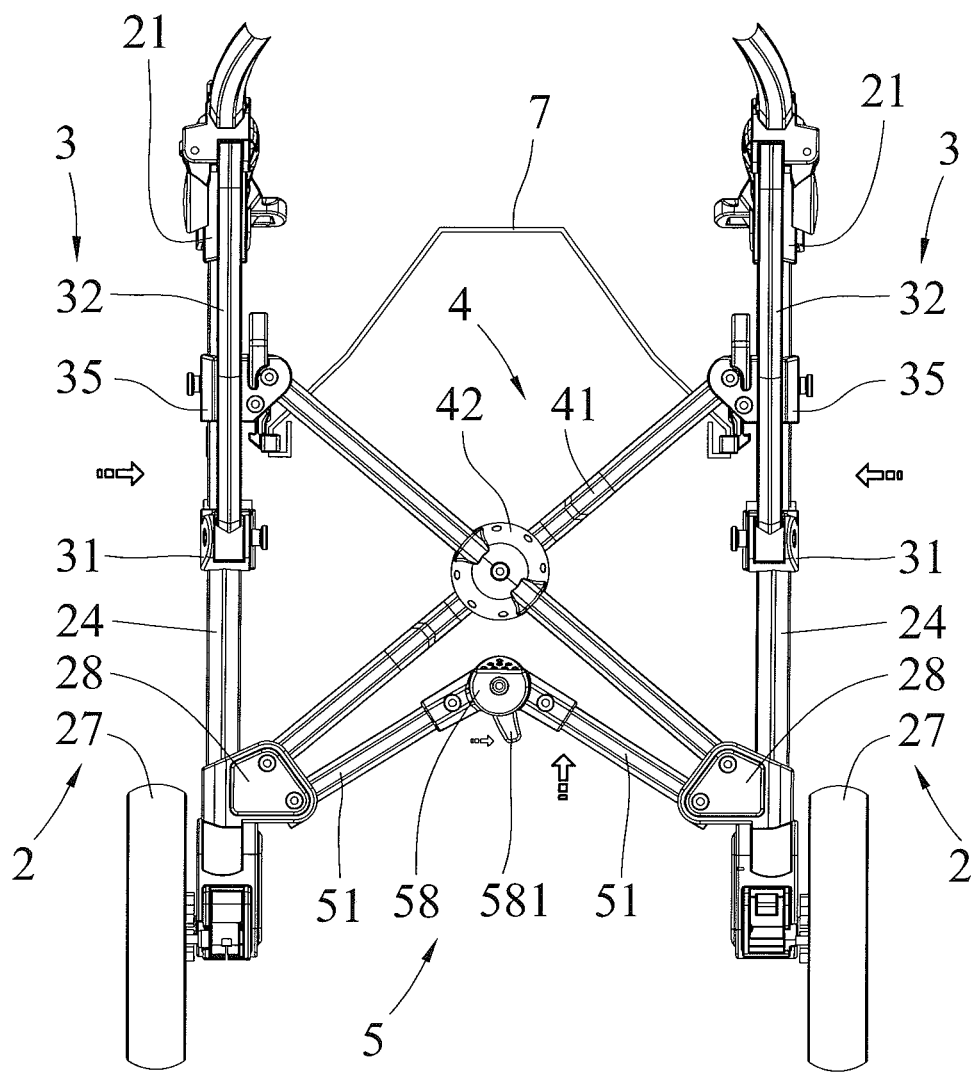
FIG. 16 is a schematic operational view of the baby stroller as shown in FIG. 10.
Figure 18:
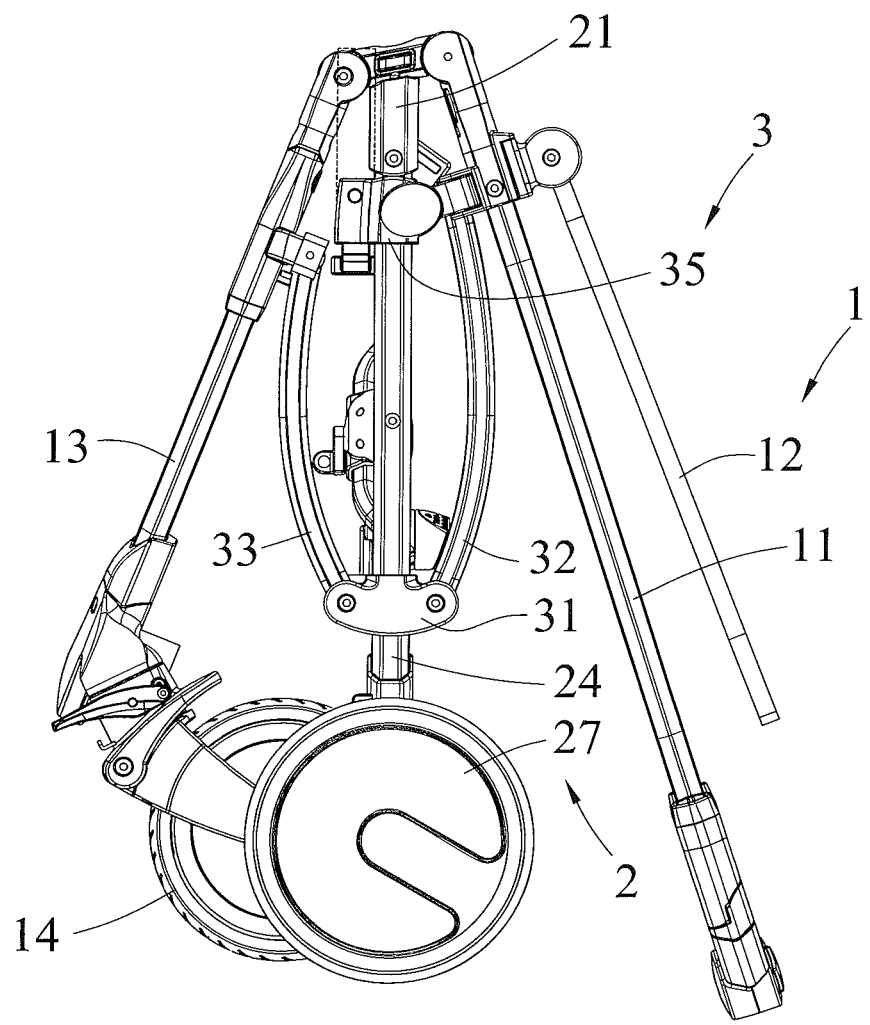
FIG. 18 is a schematic operational view of the baby stroller as shown in FIG. 17.

In folding, referring to FIGS. 13-18 with reference to FIGS. 1-12, the canopy 8 and the basket 9 are initially detached. Then, the retainer 23 of each of the support units 2 is pressed by the user to compress the first elastic member 22 so that the retainer 23 of each of the support units 2 is moved to detach from the locking groove 63 of each of the plugs 62 so as to unlock each of the plugs 62 of the handle unit 6 from the retainer 23 of each of the support units 2. At this time, the push member 25 of each of the support units 2 is pushed upward by the second elastic member 26 so that each of the plugs 62 of the handle unit 6 pushed upward by the push member 25 of each of the support units 2 to detach the handle unit 6 from the connecting piece 21 of each of the support units 2 as shown in FIG. 13. Thus, the handle unit 6 is removed. Then, the drive plate 531 of the control member 53 of the locking mechanism 5 is driven by the user to rotate the control member 53 so that the flanges 532 of the control member 53 are moved in the first slots 522 of the first rotary base 52 and the second slots 551 of the positioning block 55. At this time, the oblique side 533 of each of the flanges 532 of the control member 53 abuts the oblique wall of each of the second slots 551 of the positioning block 55, so that when the flanges 532 of the control member 53 are moved in the first slots 522 of the first rotary base 52 and the second slots 551 of the positioning block 55, the positioning block 55 of the locking mechanism 5 is pushed toward the second rotary base 56 by the flanges 532 of the control member 53 to compress the fifth elastic member 57 and to detach from the first receiving recess 521 of the first rotary base 52, and is fully received in the second receiving recess 561 of the second rotary base 56 as shown in FIG. 14. In such a manner, the rails 552 of the positioning block 55 are detached from the first tracks 523 of the first rotary base 52 and are fully received in the second tracks 562 of the second rotary base 56 so that the first rotary base 52 and the second rotary base 56 are unlocked from the positioning block 55, and the folding bars 51 are unlocked and can be pivoted freely. Then, the pull strap 7 is pulled by the user so that the pivot member 36 of each of the linking units 3 is pivoted to compress the third elastic member 37 and to detach the protrusion 362 of the pivot member 36 from the retaining slot 34 of the first connecting block 31 as shown in FIG. 15. In such a manner, the first connecting block 31 and the second connecting block 35 of each of the linking units 3 are unlocked from the pivot member 36 so that the first connecting block 31 and the second connecting block 35 of each of the linking units 3 can be freely moved on the rear leg 24 of each of the support units 2. When the folding bars 51 are pivoted, the oblique levers 41 of the cross connection unit 4 are pivoted and retracted inward as shown in FIG. 16, so that the bendable joints 111 of the upper frame 11 and the bendable joints 131 of the lower frame 13 of the frame unit 1 are bent. In such a manner, the upper frame 11 and the lower frame 13 of the frame unit 1 are retracted inward, while the support units 2 and the linking units 3 are forced to move inward toward the middle position of the frame unit 1. At this time, the first connecting block 31 of each of the linking units 3 is moved downward as shown in FIG. 17 to the lower portion of the rear leg 24 of each of the support units 2, so that the upper curved lever 32 and lower curved lever 33 of each of the linking units 3 are pulled downward, and the upper frame 11 and the lower frame 13 of the frame unit 1 are pivoted downward. Finally, the upper frame 11 and the lower frame 13 of the frame unit 1 are moved and juxtaposed to the upper curved lever 32 and lower curved lever 33 of each of the linking units 3 as shown in FIG. 18 so as to fold the baby stroller. At this time, the rear wheels 27 of the support units 2 and the upper frame 11 of the frame unit 1 abut the ground to support the baby stroller.

On the contrary, the above mentioned procedures can be proceeded reversely so as to expand the baby stroller. It is to be noted that, after the support units 2 and the linking units 3 are expanded, the user can tread the foot pedal 58 of the locking mechanism 5 to pivot and move the folding bars 51 downward until the folding bars 51 are disposed at the horizontal state so as to accelerate unfolding of the baby stroller.

Accordingly, the upper frame 11 and the lower frame 13 of the frame unit 1 are pivoted downward to be close to each other so as to collapse the frame unit 1 into two parts after the stroller is folded, thereby largely reducing the height of the folded baby stroller, and thereby facilitating storage, transportation and packaging of the folded baby stroller. In addition, the user has to drive the control member 53 for unlocking the locking mechanism 5 and has to pull the pull strap 7 for unlocking the first connecting block 31 and the second connecting block 35 of each of the linking units 3 so as to collapse the baby stroller so that the baby stroller is folded by two stages, thereby preventing the baby stroller from being collapsed due to accidental hit or unintentional touch, and thereby enhancing the operational safety of the baby stroller.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A baby stroller comprising:
a frame unit;
two support units connected with the frame unit;
two linking units connected with the frame unit and the support units;
a cross connection unit mounted between the support units and the linking units;
a locking mechanism mounted between the support units;
a handle unit connected with the support units; and
a pull strap connected with the linking units;
wherein:
the frame unit includes:
an upper frame having two opposite ends each provided with an upper connector pivotally connected with each of the support units;
a lower frame having two opposite ends each provided with a lower connector pivotally connected with each of the support units;
a side frame pivotally connected with the upper frame; and
at least one front wheel mounted on the lower frame;
each of the support units includes:
a rear leg;
a connecting piece mounted on a first end of the rear leg and having a top provided with a locking recess and a side provided with a mounting recess connected to the locking recess;
a retainer mounted in the mounting recess of the connecting piece and provided with a locking hole;
a first elastic member mounted in the mounting recess of the connecting piece and biased between the connecting piece and the retainer;
a push member mounted in the rear leg;
a second elastic member mounted in the rear leg and biased between the rear leg and the push member;

a rear wheel mounted on a second end of the rear leg; and
a connecting bracket mounted on the second end of the rear leg;
each of the linking units includes:
a first connecting block movably mounted on the rear leg of each of the support units and provided with a retaining slot;
an upper curved lever having a first end pivotally connected with the first connecting block and a second end pivotally connected with the respective upper connector of the upper frame of the frame unit;
a lower curved lever having a first end pivotally connected with the first connecting block and a second end pivotally connected with the respective lower connector of the lower frame of the frame unit;
a second connecting block movably mounted on the rear leg of each of the support units;
a pivot member pivotally mounted on the second connecting block and having a first end provided with a receiving hole and a second end provided with a protrusion inserted into the retaining slot of the first connecting block; and
a third elastic member mounted in the receiving hole of the pivot member and biased between the pivot member and the second connecting block;
the pivot member of each of the linking units is provided with a hooked hole located opposite to the protrusion;
the cross connection unit includes:
two oblique levers intersecting each other to form a substantially X-shaped link; and
two rotation members each mounted on a mediate portion of each of the oblique levers;
the rotation members of the cross connection unit are pivotally connected with each other;
each of the oblique levers of the cross connection unit has a first end pivotally connected with the connecting bracket of each of the support units and a second end pivotally connected with the second connecting block of each of the linking units;
the locking mechanism includes:
two folding bars each having a first end pivotally connected with the connecting bracket of each of the support units;
a first rotary base mounted on a second end of one of the folding bars;
a second rotary base mounted on a second end of the other one of the folding bars;
a positioning block mounted between the first rotary base and the second rotary base;
a control member mounted on the first rotary base;
a fourth elastic member having a first end mounted on the first rotary base and a second end mounted on the control member; and
a fifth elastic member biased between the positioning block and the second rotary base;
the first rotary base of the locking mechanism has a first side provided with a first receiving recess, a plurality of first slots and a plurality of first tracks;
the second rotary base of the locking mechanism has a first side provided with a second receiving recess and a plurality of second tracks;
the positioning block of the locking mechanism is mounted in the first receiving recess of the first rotary base and the second receiving recess of the second rotary base and is provided with a plurality of second slots and a plurality of rails;
each of the second slots of the positioning block has an oblique wall;
the rails of the positioning block are received in the first tracks of the first rotary base and the second tracks of the second rotary base;
the control member of the locking mechanism is rotatably mounted on a second side of the first rotary base and is provided with a plurality of flanges extended into the first slots of the first rotary base and the second slots of the positioning block;
each of the flanges of the control member is provided with an oblique side abutting the oblique wall of each of the second slots of the positioning block;
the handle unit includes:
a handlebar; and
two plugs mounted on two opposite ends of the handlebar;
each of the plugs of the handle unit is inserted into the locking recess of the connecting piece and the locking hole of the retainer of each of the support units;
each of the plugs of the handle unit has a periphery provided with an annular locking groove locked by the retainer of each of the support units; and
the pull strap has two opposite ends each secured on the hooked hole of the pivot member of each of the linking units.

2. The baby stroller of claim 1, wherein:
each of the support units further includes a limit pin extended through the retainer and secured on the connecting piece; and
the retainer of each of the support units is provided with an elongate slit slidably mounted on the limit pin so that the retainer of each of the support units is slidable in the mounting recess of the connecting piece.

3. The baby stroller of claim 1, wherein:
each of the support units further includes a guide pin extended through the connecting piece, the rear leg and the push member;
the push member of each of the support units is provided with an elongate slot slidably mounted on the guide pin so that the push member of each of the support units is slidable in the rear leg; and
the second elastic member of each of the support units has a first end abutting the guide pin and a second end abutting the push member.

4. The baby stroller of claim 1, wherein:
the baby stroller further comprises a canopy connected with the frame unit; and
the canopy is mounted on the upper frame, the side frame and the lower frame of the frame unit.

5. The baby stroller of claim 1, wherein:
the baby stroller further comprises a basket connected with the linking units; and
the basket is mounted between the lower curved levers of the linking units.

6. The baby stroller of claim 1, wherein:
each of the first slots of the first rotary base has a substantially arcuate shape;
the locking mechanism further includes a connecting pin extending through the control member, the fourth elastic member, the first rotary base, the positioning block, the fifth elastic member and the second rotary base;
the first receiving recess of the first rotary base has a depth smaller than the height of the positioning block; and
the second receiving recess of the second rotary base has a depth greater than or equal to the height of the positioning block.

7. The baby stroller of claim 1, wherein the control member of the locking mechanism has a periphery provided with an elongate a drive plate.

8. The baby stroller of claim 1, wherein:

the locking mechanism further includes a foot pedal mounted on the second rotary base;

the foot pedal of the locking mechanism is mounted on a second side of the second rotary base and is provided with a limit slot; and the second side of the second rotary base is provided with a limit post mounted in the limit slot of the foot pedal.

9. The baby stroller of claim 1, wherein:

each of the plugs of the handle unit has a tapered distal end;

the handlebar of the handle unit has a substantially inverted U-shaped profile;

the first connecting block of each of the linking units is disposed under the second connecting block; and the second connecting block of each of the linking units is disposed under the connecting piece of the respective support unit.

\* \* \* \* \*